June 16, 1964    A. D. TINKELENBERG    3,137,130
VARIABLE THRUST LIQUID PROPELLANT ROCKET INJECTOR
Filed July 25, 1961
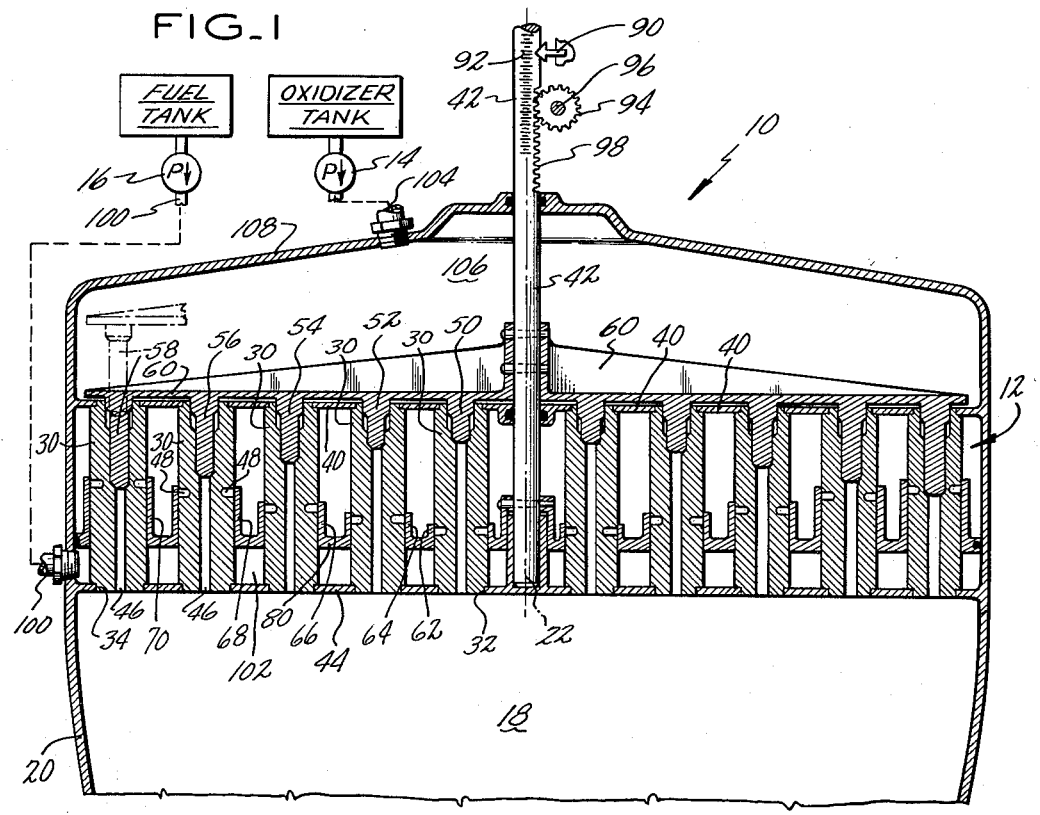
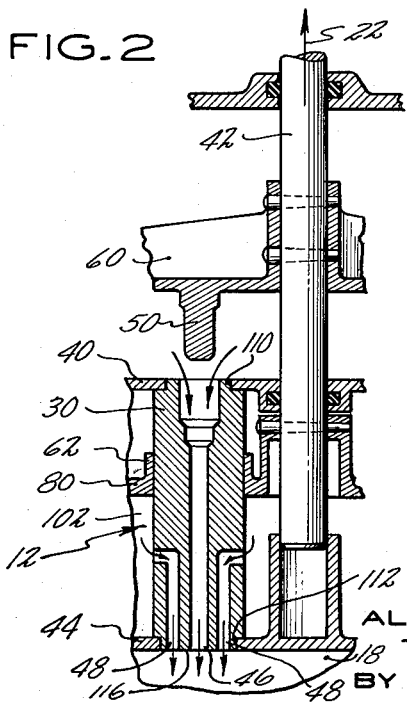
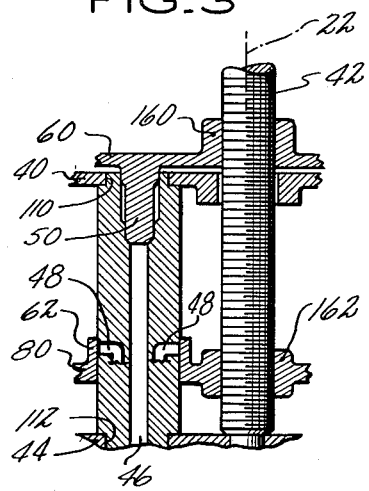
INVENTOR
ALBERT D. TINKELENBERG
BY Vernon F. Hauschild
ATTORNEY United States Patent Office 3,137,130
Patented June 16, 1964

3,137,130
VARIABLE THRUST LIQUID PROPELLANT ROCKET INJECTOR
Albert D. Tinkelenberg, Manchester, Conn., assignor to United Aircraft Corporation, East Hartford, Conn., a corporation of Delaware
Filed July 25, 1961, Ser. No. 126,615
5 Claims. (Cl. 60—35.6)

This invention relates to rocket engines and more particularly to variable thrust fluid propellant injectors.

It is an object of this invention to provide an injector for fluid propellant rockets, i.e. liquid-liquid, liquid-gas or gas-gas propellants, which controls the rocket thrust by controlling the rate of propellant flow to the rocket engine combustion chamber by varying selectively and sequentially the total area of the flow passages or conduits within the injector through which the fluid fuel and the fluid oxidizer must pass.

It is a further object of this invention to teach rocket engine thrust control as stated above wherein thrust variation may be accurately calibrated either manually or by control operation and by flowing the injector before firing.

It is a further object of my invention to teach such a rocket injector wherein the fuel manifold area is increased as fuel flow is increased so that the cooling flow is maintained nearly constant across the injector face at all flow or total fuel propellant conduit areas.

It is a further object of this invention to teach a fluid propellant injector for rockets wherein the regions provided for fuel and oxidizer flow are interchangeable.

It is still a further object of this invention to teach a fluid propellant injector for rockets which may be calibrated so that the ratio of oxidizer to fuel or the ratio of pounds of oxidizer flow to the pounds of fuel flow may be maintained constant or may be varied at a prescribed rate with changes in the thrust level.

Other objects and advantages will be apparent from the specification and claims and from the accompanying drawings which illustrate an embodiment of the invention.

FIG. 1 is a fragmentary cross sectional showing of my injector head in environment.

FIG. 2 is an enlarged, fragmentary showing similar to FIG. 1.

FIG. 3 is a fragmentary showing of my liquid propellant injector wherein propellant flow control is obtained by control rod rotation.

Referring to FIG. 1 we see my liquid propellant rocket 10 which comprises propellant injector 12 which is provided oxidizer by oxidizer pump 14 and fuel by fuel pump 16 and which discharges said fuel and oxidizer into the rocket thrust or combustion chamber 18 which is defined within rocket engine walls 20. A pressurized propellant tank system could be used in place of propellant pumps 14 and 16. Since my invention relates to the rocket injector, the rocket injector only will be described in great particularly herein and reference is hereby made to Rocket Propulsion Elements, by G. P. Sutton, published by John Wiley & Sons, New York, N.Y., pages 235–239, 246–247 and 298–299, 1956, for a description of a complete rocket engine embodiment of the liquid propellant type.

Rocket thrust chamber 18, and injector head 12 are of generally circular cross section and concentric about axis 22. Rocket injector 12 comprises a plurality of propellant flow conduit defining elements 30, which are preferably of circular cross section and positioned to define a plurality of concentric rings of elements such as 32 about axis 22. The first and smallest diameter element ring is shown at 32 while the largest such ring is shown at 34. While my propellant conduit defining members 30 are preferably of circular cross section, one skilled in the art will readily see that element 32 could be of annular shape forming a one piece ring which is concentric about axis 22. Elements 30 are supported in position to define a solid, wheel-shaped unit which is concentric about axis 22 by a circular plate 40 which extends laterally from and encircles axially movable control rod 42 and circular plate 44 which also extends laterally from and encircles shaft 42 to permit shaft movement. Elements 30 are attached to plates 40 and 44 by any convenient means such as welding. Propellant flow conduit defining members 30 include a central bore 46 which constitutes an oxidizer flow passage and also has a fuel flow 48 therethrough which extend from the sides of elements 30 to the same end of element 30 as does central bore 46. As shown in FIG. 1, plungers such as 50, 52, 54, 56 and 58 are of variable length and are shaped to be received within the central bore 46 of each element 30 to regulate the flow area and hence flow therethrough. The plungers for each circumferential row of elements at the same radial position such as 32 are of the same length while the plungers 50 through 58 used in different rows or rings of elements 30, such as 32 or 34, are of different lengths. Each of the plungers 50 through 58 is connected to circular and perforate plate 60 which is connected to and extends laterally from reciprocating shaft 42 so that as the shaft moves along axis 22 away from the injector face 44 or combustion chamber 18, plungers 50 first clear the small diameter bore of elements 30 in row 32 and plungers 52 through 58 follow sequentially.

Similarly, sleeve members 62, 64, 66, 68 and 70 are sleeved over elements 30 and are of varying lengths and are connected to circular plate 80 which extends laterally from and is connected to reciprocating shaft 42 such that as reciprocating shaft 42 moves away from combustion chamber 18, sleeves 62 through 70 sequentially open fuel passages 48, begining with row 32. It will be noted that passages 48 communicate with the side surface of element 30 at a greater distance from plate 44 or combustion chamber 18 with each successive ring as the distance of element 30 from axis 22 increases. Accordingly, both liquid fuel and liquid oxidizer are sequentially and progressively added to rocket combustion chamber 18 through injector head 22 as shaft 42 is pulled away from combustion chamber 18 and flow is reduced when shaft 42 is moved toward combustion chamber 18, so that constant or controlled oxidizer-to-fuel ratio is maintained at all levels of propellant flow.

While both the height of sleeves 62 through 70 and plungers 50 through 58 are shown to increase in height or length with distance from axis 22, it will be obvious to those skilled in the art that for purposes of improved propellant flow distribution into combustion chamber 18, the relative size of the sleeves and the plungers may be varied in any desired fashion to alter the location sequence of admitting the propellants into the combustion chamber.

As best shown in FIG. 2, plates 60 and 80, plunger 50 and sleeve 62 have moved with shaft 42, away from plate 44 to open both the central oxidizer passage 46 and the fuel passages 48, which are preferably positioned circumferentially about element 30. FIG. 2 shows clearly that element 30 extends through apertures 110 and 112 in plates 40 and 44, respectively, so that the top 114 and bottom 116 thereof communicate with oxidizer manifold 106 and rocket engine combustion chamber 18, respectively. Accordingly, oxidizer conduit 46 communicates with the combustion chamber 18 and the oxidizer manifold 106. It will further be noted that fuel passages 48 communicate with the side surface 130 of element 30 and the bottom surface 116 thereof so that passages 48 extend between fuel manifold 102 and combustion chamber 18. Elements 30 are attached to plates 40 and 44 by any convenient method such as welding, and plates 44 are in turn attached to walls 20 of combustion chamber 18 to thereby rigidly support injector head 12 in stationary position. Since plates 40, 44, 60 and 80 are preferably solid and since the latter two are movable relative to the former two, it will be noted that fuel manifold 102 is variable area thereby giving the advantage of increased manifold propellant flow with increased propellant flow conduit total area and this provides maximum cooling along plate 44 which is in direct contact with combustion chamber 18.

By calibrating rod 42 as shown by arrow 90 and calibration marks 92, the total area defined by plungers 50–58 with central bores 46 and the total area defined by sleeves 62 through 70 with fuel passages 48 may be accurately varied so as to accurately vary the thrust generated by the rocket engine 10. Rod 42 can be made to reciprocate by means of pinion or gear 94 which is carried on shaft 96 and engages rack teeth 98 on rod 42.

As best shown in FIG. 3, control rod 42 could also be moved axially along axis 22 by rotation. In this modification, the control rod 42 would be threaded to bushings 160 and 162, which bushings are attached to plates 60 and 80 respectively so that the rotation of shaft 42 causes the axial translation of plates 60 and 80.

The liquid fuel which leaves pump 16 passes through line 100 into the variable area fuel manifold 102, which is defined between stationary plate 44 and movable plate 80, while liquid oxidizer which leaves pump 14 passes through line 104 and into the oxidizer header 106 which is defined between wall 108 and plate 40.

In the light of the above description it will be seen that by translating control shaft 42, the total propellant flow area for both fuel and oxidizer in injector 12 is sequentially varied, thereby sequentially varying rocket thrust and selectively varying rocket thrust in accordance with calibration unit 92.

It is to be understood that the invention is not limited to the specific embodiment herein illustrated and described but may be used in other ways without departure from its spirit as defined by the following claims.

I claim:

1. A variable thrust liquid propellant rocket injector which is of generally circular cross-section and concentric about an axis and communicates with a combustion chamber and which comprises a plurality of propellant flow conduit defining apparatus having an outer periphery including sides, a top and a bottom and positioned concentrically about said axis and defining a plurality of both liquid oxidizer and liquid fuel passages opening into said combustion chamber and, means to provide liquid fuel and liquid oxidizer to the respective passages, and means to sequentially vary the area of and hence the flow through said fuel and oxidizer passages thereby controlling oxidizer to fuel ratio at all propellant flow levels.

2. Apparatus according to claim 1 wherein said liquid oxidizer flow passages constitute axially extending passages within said flow conduit defining apparatus and extending between the top and bottom thereof and said liquid fuel passages constitute passages extending between the sides and the bottom of said flow conduit defining apparatus.

3. Apparatus according to claim 2 wherein said area varying means comprises a plurality of plungers of varying length extending into said liquid oxidizer passages and further includes sleeves of varying lengths passing over and blocking said liquid fuel passages.

4. Apparatus according to claim 3 wherein said plungers and said sleeves are caused to translate in unison by means of plates attached to said plungers and said sleeves and also attached to a reciprocal post extending along said axis.

5. A liquid propellant rocket, walls defining a combustion and thrust chamber having an axis, an injector head comprising a movable shaft reciprocatable along said axis, axially spaced plates adjacent and each on one side of said combustion chamber and extending laterally from said axis, attached to said walls and encircling said shaft and including sets of aligned apertures therein, a plurality of propellant flow passage defining elements each extending between and attached to said plates and extending through a set of said aligned apertures to communicate with the opposite sides of said plates, said elements including oxidizer flow passages extending through said elements and communicating with the opposite ends thereof and fuel passages extending from a side of said elements and at different positions thereon to the combustion chamber end thereof, a plurality of plungers of different length extending into said oxidizer passages, a plurality of sleeves of varying length sleeved over said elements to cover said fuel conduit, and means joining said plungers and said sleeves to said shaft for movement therewith thereby sequentially varying propellant and fuel flow passage total area through said injector.

References Cited in the file of this patent

UNITED STATES PATENTS

| | | |
|---|---|---|
| 2,810,259 | Burdett | Oct. 22, 1957 |
| 2,919,543 | Sherman et al. | Jan. 5, 1960 |
| 2,936,577 | Amneus | May 17, 1960 |